United States Patent

Cushing

[15] 3,693,439
[45] Sept. 26, 1972

[54] ELECTROMAGNETIC WATER CURRENT METER

[72] Inventor: Vincent J. Cushing, 9804 Hillridge Drive, Kensington, Md. 20795

[22] Filed: July 30, 1971

[21] Appl. No.: 167,673

[52] U.S. Cl. .................................. 73/194 EM, 73/181
[51] Int. Cl. ............................ G01f 1/00, G01p 5/08
[58] Field of Search ............................... 73/194 EM

[56] References Cited

UNITED STATES PATENTS

| | | | |
|---|---|---|---|
| 2,808,723 | 10/1957 | Buntenbach | 73/194 EM |
| 3,114,260 | 12/1963 | Soller et al. | 73/194 EM X |
| 3,329,018 | 7/1967 | Hognestad | 73/194 EM |
| 3,329,020 | 7/1967 | Cushing | 73/194 EM |

Primary Examiner—Charles A. Ruehl
Attorney—Snyder, Brown & Ramik

[57] ABSTRACT

An electromagnetic water current meter employing a magnet producing an alternating flux field which is of finite intensity and zero slope during a significant portion of each half cycle. The electrodes which receive the water current-generated voltage signal exhibit a sufficiently high resistivity as to assure that the distributed capacitance at the exposed faces of the electrodes does not cumulatively produce an integrating effect which will extend decay of "transformer effect" voltages into the terminal portions of each half cycle during which signal sampling is effected. Carbon which displays a resistivity of about 3,500 microhm-cm at room temperature is a preferred material.

5 Claims, 1 Drawing Figure

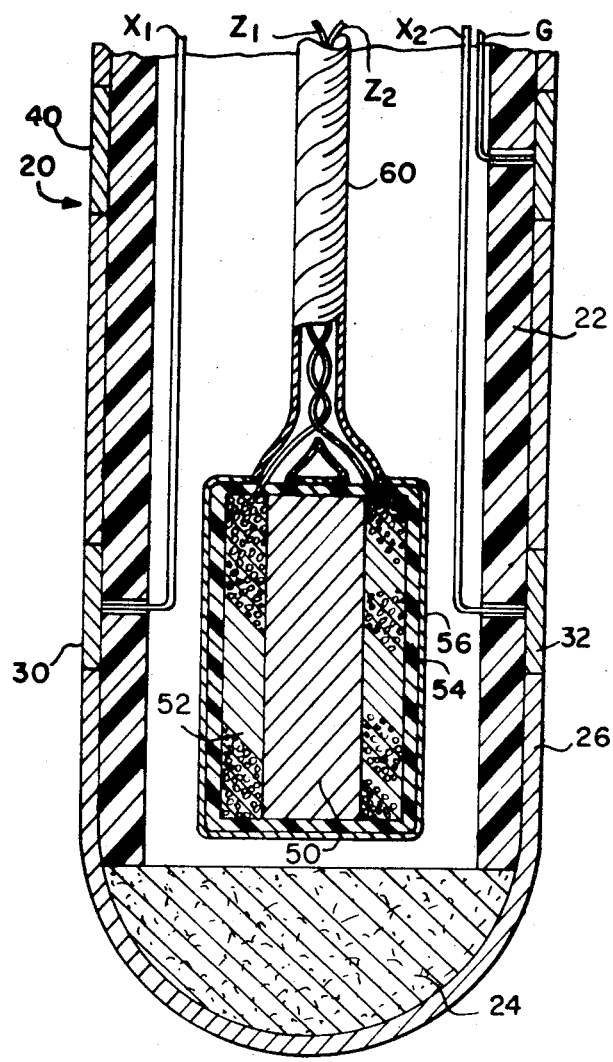

ELECTROMAGNETIC WATER CURRENT METER

BACKGROUND OF THE INVENTION

In the electromagnetic measurement of water current velocity components, it has become well recognized that cyclic reversal of the magnet field is of substantial value. With sinusoidal excitation of the magnet winding and phase-sensitive detection of the electrical signal picked up by a pair of sensing electrodes, quadrature noise voltage is rejected by the phase-sensitive detector or, if manifested to some extent at the output of the detector, has been bucked by a suitable reference voltage. Unfortunately, the noise voltage typically displays phase shift as conditions vary which is interpreted by the phase-sensitive detector as a variation in velocity so that zero-point or base line drift of such instruments becomes a significant problem.

Since the quadrature error mentioned above is attributable to the alternating magnetic induction and is dependent upon the time-rate-of-change of B (B is intensity of magnetic induction), it has been proposed that the magnet winding be driven by an alternating square or rectangular wave signal so that the magnetic induction will be "quiet" (i.e. B O) during at least a terminal portion of each half cycle. Based upon this theory, if the velocity-generated signal is sampled only during this terminal portion of each half cycle, the root cause of base line drift should disappear. Unfortunately, although the base line drift problem may be attenuated, it does not disappear sufficiently to meet the stringent requirements of some applications.

BRIEF SUMMARY OF THE INVENTION

Accordingly, it is of principal concern in connection with this invention to provide means whereby the base line drift of the latter type of electromagnetic type of water current meter may be reduced to extremely low values and wherein the instrument may be made insensitive to variations in the conductivity of the water (i.e. does not require recalibration for use in waters of different conductivity such as fresh water as opposed to salt water). Briefly, the present invention is directed to the use of electrodes which have a relatively high resistivity. By "relatively high resistivity" is meant a resistivity which is of a value substantially greater than that of the metallic electrodes (i.e. stainless steel) used in prior art devices and preferably in the order of that of carbon or greater. Relatively pure carbon is an excellent material, as is boron carbide. Various mixtures of graphite in synthetic resinous material in proportions sufficient to obtain a high enough value of resistivity are also useful.

BRIEF DESCRIPTION OF THE DRAWING

The drawing FIGURE illustrates a probe in longitudinal section and shows the disposition of the electrodes of this invention.

DETAILED DESCRIPTION OF THE INVENTION

In the drawing, a cylindrical body means is indicated by the reference character 22 and which is provided with a lower end portion 24 closing off such end of the body, there being similar provision at the upper end of the body, not shown. The body means 22 and associated components hereinafter described form a closed generally cylindrical transducer indicated generally by the reference character 20 and for protection as well as antifouling purposes, the exterior of the transducer is coated with non-conductive, anti-fouling paint or the like as indicated by the outer layer 26. The material from which the body means 22 is constructed is electrically non-conductive and is substantially rigid and may be made, for example, from synthetic resinous material reenforced by fiberglass.

A pair of electrode buttons 30 and 32 are disposed in diametrically opposed relationship with respect to the lower end portion of the cylindrical body 22 and are respectively electrically connected to the two conductors $X_1$ and $X_2$, as shown. The outer faces of the electrode buttons 30 and 32 are exposed to the ambient water to provide electrical contact therewith. An annular ground electrode 40 is provided as shown and is connected electrically to a suitable ground conductor G.

The exciting magnet is comprised of a winding 52 encasing a suitable core 50 and the whole is potted within an encapsulating layer or body of insulating material 54. Further, there is provided a thin layer of electrically conductive material such as silver paint on the outer surface of the insulation 54 to serve as a shield for shielding the electromagnetic from the detecting electrodes. The winding 52 is provided with two electrical conductor leads $Z_1$ and $Z_2$ which are encased within a cylindrical shield 60 of electrically conductive material disposed in surrounding relationship thereto and these conductors as well as the other conductors hereinbefore mentioned, are extended externally of the transducer 20 for connection to the requisite electronic circuitry.

The construction of the transducer as is shown in the drawing is identical with that described in conjunction with my copending application Ser. No. 68,674 filed Sept. 1, 1970, the subject matter of such copending application being incorporated by reference herein. The leads $Z_1$ and $Z_2$ are connected to a suitable magnet driver circuit which causes alternating square wave magnetic induction of the magnet assembly as is described in the copending application and the conductors $X_1$ and $X_2$ are connected to a suitable amplifier and further electronic circuitry such that the current-generated voltage across the electrodes 30 and 32 is sampled during the terminal portion of the "quiet" period of the magnetic induction.

A preferred material for the electrodes 30 and 32 which preferably are of circular disc-like form, is carbon arc electrode material having a resistivity of several thousand microhm-cm. Another useful material for forming the electrodes 30 and 32 is boron carbide and, as well, various mixtures of powdered graphite with epoxy, acrylic and vinyl binders are also useful. For example, from about 10 to about 90 percent by weight of powdered graphite may be admixed with epoxy, acrylic or vinyl synthetic resinous materials as binders therefor and the mix after hardening formed to the suitable shape of the electrode devices 30 and 32. In this instance, it will be appreciated that the mixture of synthetic resinous material and the powdered graphite will be effective substantially to increase the resistivity of graphite so that it is at a value equal to or in excess of the resistivity of carbon.

With high resistivity electrode material, care must be taken to make the electrodes sufficiently thin as to avoid excessive source impedance. A typical example of dimensions of a carbon arc electrode material used for the electrodes 30 and 32 is a diameter of approximately 0.5 inch and having a thickness 0.125 inches for a 3 inch diameter probe.

The effect of the high resistivity of the electrode material is to minimize the integrating effect of the distributed capacitance across the exposed faces of the electrodes 30 and 32 which are caught in contact with the water. I have found that unless the electrode material has a high resistivity at least in the direction parallel to the probe surface and transverse to the lines of magnetic induction in the water, the cumulative effect of the distributed capacitance does not permit the "transformer effect" voltages to decay rapidly enough as to eliminate or substantially eliminate their effect during the terminal portion of the "quiet" period. To this end, elementary electrically conductive material encapsulated in a suitable material such as synthetic resinous epoxy material or the like with the ends of the filaments exposed at the outer faces of the electrodes 30 and 32 and with the exposed inner faces of the filaments electrically conducted to conductors $X_1$ and $X_2$ respectively it is contemplated to provide low input impedance while, at the same time, providing for high resistivity transversely within the electrodes 30 and 32 thereby to avoid the cumulative integrating effect of the distributed capacitance which I have found to be deleterious with respect to minimizing base line drift.

What is claimed is:

1. In an electromagnetic water current meter including magnet means, means for exciting said magnet means to produce alternating magnetic induction having a fixed value during a substantial portion of each half cycle, a pair of electrodes disposed in spaced relation symmetrically within the magnetic field produced by said magnet means, sampling means for sampling the water current-generated signal through said electrodes during a terminal portion only of each half cycle, and means for generating a water current velocity signal from such samples, the improvement wherein:

said electrodes are formed of electrically conductive material having a resistivity at least in the direction parallel to the surfaces of the electrodes and transverse to the direction of lines of magnetic induction in the water which is of a value sufficiently high as to assure substantially complete decay of "transformer effect" voltages by the time of the beginning of said terminal portion of each half cycle.

2. In the water current meter as defined in claim 1 wherein said material is carbon.

3. In the water current meter as defined in claim 1 wherein said material is boron carbide.

4. In the water current meter as defined in claim 1 wherein said material is a mixture of graphite and a binder material of synthetic resinous material.

5. In the water current meter as defined in claim 1 wherein said magnet means is surrounded with a shield of electrically conductive material.

* * * * *